(12) United States Patent
Sonnenberg et al.

(10) Patent No.: US 8,499,648 B2
(45) Date of Patent: Aug. 6, 2013

(54) GAS METER

(75) Inventors: Hans-Michael Sonnenberg, Ansbach (DE); Andreas Hegendoerfer, Puschendorf (DE)

(73) Assignee: Hydrometer GmbH, Ansbach (DE)

( * ) Notice: Subject to any disclaimer, the term of this patent is extended or adjusted under 35 U.S.C. 154(b) by 90 days.

(21) Appl. No.: 13/286,397

(22) Filed: Nov. 1, 2011

(65) Prior Publication Data

US 2012/0118407 A1 May 17, 2012

Related U.S. Application Data (60) Provisional application No. 61/437,073, filed on Jan. 28, 2011.

(30) Foreign Application Priority Data

Nov. 16, 2010 (DE) .......................... 10 2010 051 594

(51) Int. Cl.
*G01F 1/37* (2006.01)
(52) U.S. Cl.
USPC ...................................... 73/861.52
(58) Field of Classification Search
USPC ...................................... 73/861.52
See application file for complete search history.

(56) References Cited

U.S. PATENT DOCUMENTS

| | | | |
|---|---|---|---|
| 5,905,200 A | 5/1999 | Eldridge et al. | |
| 5,992,439 A * | 11/1999 | McGill | 137/15.03 |
| 6,035,725 A * | 3/2000 | Spendel et al. | 73/861 |
| 7,360,554 B2 * | 4/2008 | Huetinck | 137/385 |
| 7,535,635 B2 * | 5/2009 | Benson et al. | 359/436 |
| 2007/0131279 A1 | 6/2007 | Thakre et al. | |
| 2011/0011478 A1 | 1/2011 | Chalupa et al. | |

FOREIGN PATENT DOCUMENTS

| | | |
|---|---|---|
| AU | 723240 | 5/1998 |
| CA | 2 324 216 | 9/1999 |
| DE | 202009009759 U1 | 10/2009 |
| EP | 0479434 A1 | 4/1992 |
| EP | 0 987 526 | 3/2000 |

\* cited by examiner

*Primary Examiner* — Jewel V Thompson
(74) *Attorney, Agent, or Firm* — Scully, Scott, Murphy & Presser, P.C.

(57) ABSTRACT

A gas meter comprising a housing (2) with a gas inlet connection (5) and an inflow chamber (16) which is arranged downstream of the latter and into which gas flows via an inflow opening (14), arranged downstream of which inflow chamber (16) is a measuring section (19) arranged upstream of a gas outlet connection (6) and having a measuring device (20), in which the gas flow is measured, wherein projecting into the inflow chamber (16) there is a tube (15) which merges into the measuring section (19) or forms the latter and runs substantially perpendicularly to the gas flow direction through the inflow opening (14) and overlaps the inflow opening (14), at least in a certain section.

14 Claims, 5 Drawing Sheets

GAS METER

CROSS-REFERENCE TO RELATED APPLICATIONS

This application claims the benefit of U.S. Provisional Application No. 61/437,073 filed on Jan. 28, 2011.

BACKGROUND OF THE INVENTION

The invention relates to a gas meter.

DISCUSSION OF THE PRIOR ART

Gas carried in natural gas lines contains a certain proportion of dirt particles and dust. Since the gas has to be fed to a gas meter for purposes of recording consumption, the dirt particles and dust are also inevitably carried into the gas meter. In the gas meter, the gas is guided past appropriate sensor elements that serve to measure the volume, e.g. a micro-thermal sensor. The contaminants contained in the gas can then settle on the sensor element or elements and can consequently have a disadvantageous effect on the measuring action or the measuring accuracy thereof.

The practice known hitherto has been to integrate screens for collecting these contaminants into the natural gas lines or into the gas meter. This is an involved process since the screens have to be inserted separately. Moreover, it cannot be excluded that the screens will become clogged to a certain extent with dirt that has been collected. Another known practice is to divert a partial gas flow that is to be measured from the main gas flow, the design of the diversion branch being chosen so that any particles contained in the gas fly past the diversion branch owing to their momentum. However, the division of the volume flow between the partial gas flow, also referred to as the bypass flow, and the main gas flow may change with respect to the volume flow, thereby reducing the useful measurement dynamics.

The problem underlying the invention is therefore that of specifying a gas meter which allows any contaminants in the form of dirt particles or dust contained in the gas supplied to be removed to a large extent in a simple manner.

SUMMARY OF THE INVENTION

To solve this problem, the invention provides a gas meter comprising a housing with a gas inlet connection and an inflow chamber which is arranged downstream of the latter and into which gas flows via an inflow opening, arranged downstream of which inflow chamber is a measuring section arranged upstream of the gas outlet connection and having a measuring device, in which the gas flow is measured, wherein projecting into the inflow chamber there is a tube which merges into the measuring section or forms the latter and runs substantially perpendicularly to the gas flow direction through the inflow opening and overlaps the inlet opening, at least in a certain section.

The gas meter according to the invention is distinguished by a special geometric arrangement of a tube, which serves as an intake tube and merges into a measuring section or forms the latter, relative to an inflow opening, via which the gas to be metered flows into an inflow chamber. The tube, which projects into this inflow chamber, can itself form the measuring section or merge directly into the latter. Situated in the measuring section, i.e. in a tube section of defined cross-sectional area, is the measuring device, e.g. a thermal sensor or the like, which serves to measure the volume of gas.

According to the invention, the tube projects into the inflow chamber and the longitudinal axis of the tube is substantially perpendicular to the fundamental direction of flow of the gas through the inflow opening. The theoretical fundamental direction of flow according to the application is perpendicular to the opening plane. Moreover, the intruding tube overlaps the inflow opening, which can be round or elongate or the like as seen in cross section, at least in a certain section, preferably over at least half the opening length of the inflow opening. The open end of the tube, which ends at right angles to the longitudinal axis of the tube is consequently virtually parallel to the gas inflow direction. The result of this arrangement or positioning of the tube relative to the inflow opening and hence to the gas inflow direction, as envisaged in the invention, is that the inflowing gas does not flow directly into the tube but is forced to flow first around the tube projecting over the inflow opening and therefore has an angular momentum imparted to it. As a result, there is a rotation of the gas flow and consequently a cyclone-like motion of the inflowing gas around the tube. The result is that any entrained dirt particles and the like are deposited in a region below the tube since they are forced into the boundary region of the vortex and fall out owing to the lower velocity there and collect at the bottom, for example. The forcibly swirled gas enters the tube only at the end of the tube after the forced swirling, that is to say after it has already been freed from entrained particles. It then passes through the tube into the measuring section, where it is measured.

Owing to the rotation or swirling of the inflowing gas enforced by the design, it is thus possible with the gas meter according to the invention to filter out or remove the dirt particles almost completely from the gas volume flow without negatively affecting the uniformity of flow in the inlet, due to the blocking of a screen for example, while, at the same time, the pressure loss due to the removal of particles is minimal.

It is particularly expedient if the inflow opening is arranged laterally offset relative to the longitudinal axis of the tube. This means that the inflow opening is not arranged precisely above the tube—as seen in the longitudinal direction of the tube—but is positioned laterally offset with respect to the tube. This has the effect that the inflowing gas likewise flows in in a position laterally offset with respect to the tube and consequently, owing to this inflow position, is necessarily swirled in the inflow chamber or that forced rotation occurs, it being possible for this to be assisted further by the chamber geometry. Fundamentally, the size of the chamber is configured in such a way that a flow vortex can form, that the flow velocity is thereby locally reduced and that a sufficiently large volume is available in which deposited particles can collect. With this offset arrangement of the inflow opening too, the fundamental relative position of the tube to the inflow opening remains the same, i.e. the opening of the tube is positioned in such a way that, by virtue of the arrangement of the tube relative to the inflow opening, there are no direct lines of flow from the inflow opening into the open end of the tube.

As already described, the tube extends across the inflow opening over at least half of the length of the opening, preferably over at least two thirds of the length of the opening, as seen in the longitudinal direction of the tube. The tube itself is preferably cantilevered, at least in the region in which it overlaps the inflow opening, thus allowing the gas to circulate around the exposed tube, which is spaced apart from all the adjacent chamber walls, virtually without hindrance.

As a development of the invention, it is possible to envisage providing a filter element, which surrounds the tube, preferably in the region of the gas inlet opening of the latter, said tube extending beyond the inflow opening, and extends to the wall of the inflow chamber. In this embodiment of the invention, the length of the tube is, on the one hand, chosen so that it extends over the entire length of the inflow opening. Moreover, a filter element is provided which separates the region of the inflow chamber into which the gas flows via the inflow opening and in which it is swirled from a region in which the tube inlet opening is provided. This means that the inflowing swirled gas must additionally pass through the filter element, this filter element being embodied as a grille or coarse-mesh filter, which does not cause an excessive pressure difference. While the vast majority of any contaminants is removed by the cyclone-type removal process according to the invention, the remainder of the contaminants entrained in the swirled gas flow is caught in this filter element. There is no risk that this filter element will become clogged since the contaminant fraction removed there is negligible.

An expedient development of the invention furthermore envisages that a flow straightener arranged upstream of the measuring device be arranged in the interior of the tube. This flow straightener is used to realign the previously swirled flow, which is still swirling, i.e. is non-directional, as it enters the tube, thus eliminating any impairment of the downstream measuring device owing to any non-uniformity of flow. In principle, it is conceivable to continue this straightener right up to the measuring device or to arrange said measuring device directly behind the straightener. However, it is equally possible for the partial flows flowing through the straightener to be recombined after the latter and to be guided to the measuring device as a common volume flow. This is because the straightening eliminates any further swirling or intermingling in the region behind the flow straightener. Moreover, there is the possibility of diverting a partial volume flow at the measuring device, feeding it to the sensor and measuring it. This partial volume flow can be diverted from the overall volume flow downstream of the straightener at a point remote from the volume flow region in which there might theoretically be some contaminants, even if only in very small quantities. Given a horizontal alignment of the measuring section, it is consequently possible for the partial volume flow to be taken off in the upper region of the tubular measuring section since, owing to their weight, any contaminants would be in the lower region of the volume flow. By this means too, an additional measure may be taken to prevent even very small quantities of any contaminants from being fed to the sensor.

As a development of the invention, provision can be made for the tube to be embodied as a twin tube with an inner and an outer tube, or for the tube to be accommodated in a second tube, at least in a certain section, with the volume between the inner and the outer tube or between the first and the second tube forming a bypass channel. This virtual twin-tube embodiment makes it possible to draw in the gas at different points and to divide it into partial streams. It may be assumed here that there is a lower degree of contamination in the region of the inner tube or of the first tube than in the outer bypass partial flow. This means that flow division is performed even before feeding to the measuring device or even before the straightener (where present), with the volume flow carried in the inner tube or the first tube being fed to the measuring device, while the bypass partial flow is not measured, this being purely by way of example. However, it would also be conceivable to recombine the bypass partial flow with the main gas flow after passage through the straightener since, by virtue of the straightening, there is no further swirling and, as a result, a defined partial flow volume which may be assumed to be free of particles can be measured within the measuring device.

In order, in particular, to standardize different connection geometries on gas meters, the inflowing gas can first of all be passed through a pre-chamber in order to form standard conditions of inflow to the inflow opening, irrespective of the specific connection geometry of the gas meter (known options include either a separate gas inlet connection and a separate gas outlet connection or a concentric connection arrangement with an inner inlet connection and an outer outlet connection or vice versa). In this pre-chamber additional swirling occurs and, there too, there are furthermore already regions of reduced flow which enable a certain proportion of dust and particles to be removed. If no such pre-chamber is used, it should be noted at this point that the inflow opening can naturally also be formed by the gas inlet connection itself, which of course leads into the interior of the housing, while the inflow chamber can then be formed by a corresponding housing section itself.

To enable the tube to be held or positioned, an insert, on which the tube is arranged and by means of which the region of the gas inlet is separated from the region of the gas outlet, is expediently arranged in the housing. Such an insert, e.g. an appropriate plastic moulding or the like, is easy to produce and the tube is fixed thereon by means of suitable retention means, if appropriate in combination with corresponding sealing elements. The insert can be configured in any desired manner as long as it allows a sealed division between the housing inlet region and the housing outlet region.

The insert itself can divide the housing into an upper and a lower section and simultaneously form the pre-chamber, the tube being accommodated in the lower housing section. Consequently, the inflow opening is formed in a wall of the insert, which wall delimits the pre-chamber and also forms the separation plane between the upper and lower chamber volumes. The tube is situated in the lower housing region.

The measuring section itself preferably opens directly into a gas outlet region, which is connected directly to the gas outlet connection. This means that the gas flows into the large-dimension inlet region, which occupies the majority of the housing. This region is therefore purged by the inlet gas. After entry into the tube, the gas passes to the measuring device and, from there, passes more or less directly into the gas outlet region and to the gas outlet. This means that, as soon as the gas is in the tube, there is ultimately only the measurement to be performed, after which the gas is discharged. The outlet channel, which is arranged downstream of the measuring device, and the gas outlet region, is thus connected to the gas outlet of the meter housing, unlike the previously known gas meters, in which the outlet region is normally of "open" configuration since a pressure compensation is required in the interspaces of the meter housing. This is generally the outlet side, that is to say that, after flowing through the measuring device, the gas enters the open meter housing. According to the invention, this is not the case here since, after passing through the measuring device, the gas is directed to the gas outlet over a more or less direct route.

Another embodiment of the insert envisages the use, as an insert, of a hollow body which is cylindrical in cross section, at least in a certain section, into which there opens a gas feed tube, which has the inflow opening and is coupled, e.g. directly, to the gas inlet, and from which hollow body the tube extends and thus merges into the measuring section. This cylindrical hollow body forms the inflow chamber. By virtue of its cylindrical shape, there is inevitably a rotation of the inflowing gas and, here too, the inflow opening is preferably arranged in a position laterally offset with respect to the overlapping tube. The insert can furthermore have a section which forms a second tube, in which the first tube is arranged.

As already described above, there is the possibility of accommodating the tube in a second tube and thus implementing a double-walled construction, with the gas entering both partial volumes from the cylindrical hollow body. In this way, it is thus possible to separate a partial or bypass gas flow from the central main gas flow, with the central main gas flow preferably being used for further measurement.

BRIEF DESCRIPTION OF THE DRAWINGS

Further advantages, features and details of the invention will become apparent from the illustrative embodiments described below and from the drawings, in which.

DETAILED DESCRIPTION OF THE INVENTION

Figure 1:
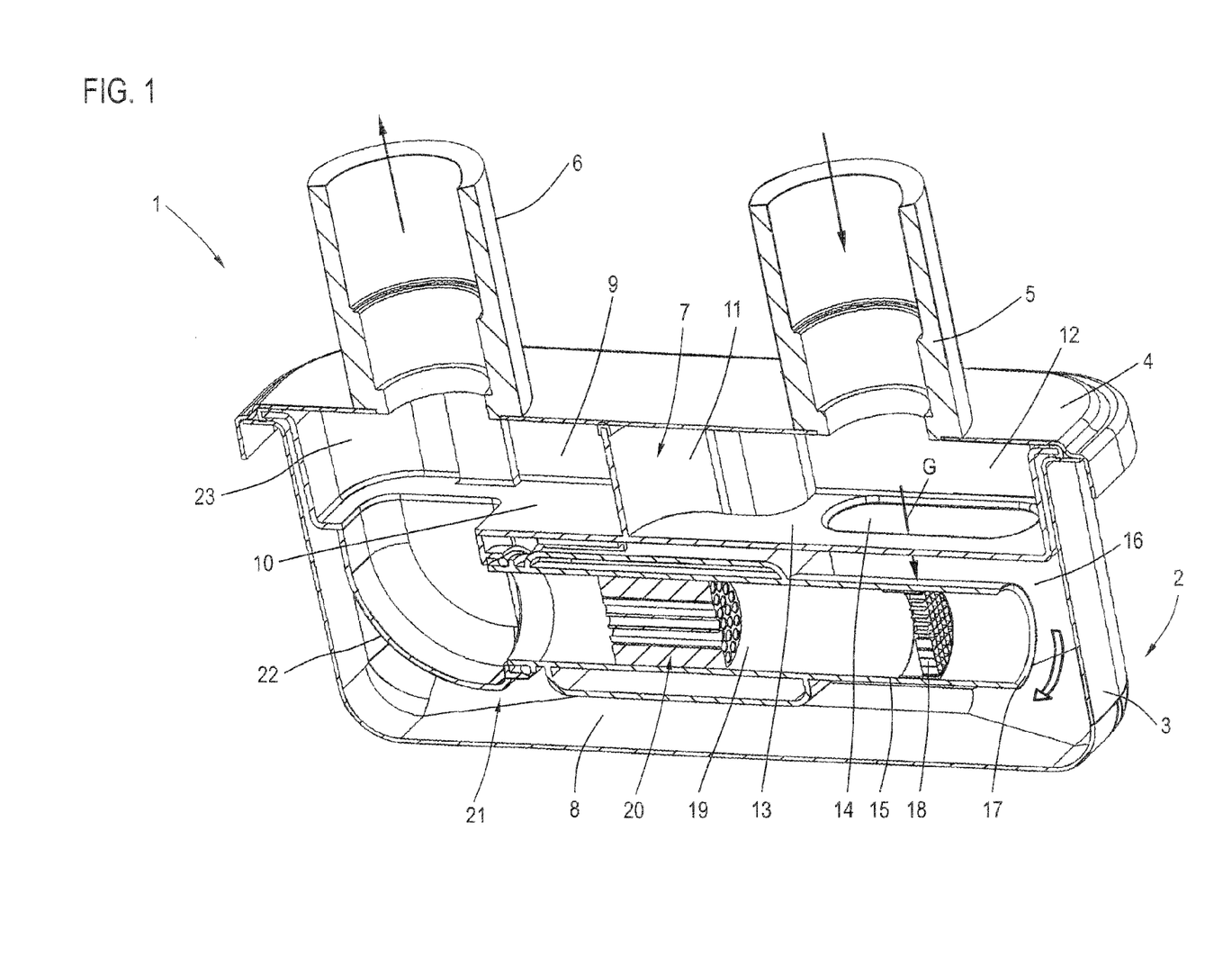
FIG. 1 shows a schematic representation of a gas meter according to the invention in section.

FIG. 1 shows a gas meter 1 according to the invention in a sectional representation. The gas meter 1 consists of a meter housing 2 comprising a lower, pot-shaped housing part 3 and a cover 4 which is placed thereon in a sealed manner and on which a gas inlet connection 5 and a gas outlet connection 6 are arranged as separate, spaced connections. Corresponding pipe conduits are connected to these.

In the housing 2 there is furthermore an insert 7, e.g. a plastic moulding, which is held in a sealed manner at the edges between the housing part 3 and the cover 4. Ultimately, the insert 7 divides the housing 2 into two regions, a lower housing region 8 and an upper housing region 9, which are separated from one another by a horizontally extending separation plane 10.

A dividing wall 11, which makes contact in a sealed manner with the cover 4, defines a pre-chamber 12, into which the gas inlet connection 5 opens. The dividing wall 11 is configured in such a way that, when a cover 4 with a different connection configuration, namely with concentrically arranged gas inlet and gas outlet connections, is placed on, access to this pre-chamber 12 is likewise provided.

The pre-chamber 12 is delimited at the bottom by section 13 of the separation plane 10. In this section 13 there is an inflow opening 14, which in this case is elongate. This inflow opening 14 leads into the lower housing region 8.

In the lower housing region 8 there is furthermore a tube 15, which is arranged on the insert 7 by means of retention means (not shown specifically). The tube 15 extends into an inflow chamber 16, which is ultimately formed by the lower housing region 8 since the lower housing region 8 as a whole is accessible via the inflow opening 14. As is evident, the tube 15 runs substantially perpendicularly to the inflow direction of the gas, which is indicated by the arrow G, through the inflow opening 14. This general direction of entry is defined as the normal to the plane in which the opening is situated. It also overlaps the inflow opening 14 virtually over the entire length thereof, that is to say that the front tube end 17 is positioned in the region of or beyond the end of the inflow opening 14. The front tube end 17 is perpendicular to the longitudinal axis of the tube 15.

Arranged in the interior of the tube 15 is a flow straightener 18, downstream of which the actual measuring section 19 is arranged, said measuring section being formed by the tube 15 in this illustrative embodiment. In the measuring section 19 there is a measuring device 20, which is not described specifically here but in all cases comprises one or more sensors, in particular thermal sensors, which is used to measure the gas flowing through the measuring section 19. In this illustrative embodiment, the measuring device 20 shown is simultaneously embodied as a differential pressure generator but can also be of some other kind or design.

As has been described, the tube 15 is connected to the insert 7 and, in the example shown, the tube 15 extends into the region of a connection point 21, at which the tube opens into an onward-leading section 22, which is formed on the insert, where the gas is deflected and guided into a gas outlet chamber 23, from where it passes directly to the gas outlet 6.

If gas flows via the gas inlet 5 into the pre-chamber 12, it is swirled there for the first time since the pre-chamber 12 has a certain asymmetric volume. The gas then flows through the inflow opening 12 into the inflow chamber 16. The inflow opening 14 is arranged laterally offset with respect to the longitudinal axis of the tube 15. In the example shown, the inflow opening 14 is obviously offset towards the side wall of the insert 7 which is at the rear, relative to the section plane. However, since the tube 15 is arranged centrally in the housing and is therefore also arranged centrally on the insert 7, there is consequently a lateral offset. The result is that the inflowing gas flows laterally past the tube 15 and there is a rotary motion, i.e. the gas flows around the tube 15. The flow thus undergoes a rotation or swirling. The inflow chamber 16 is configured in such a way that the flow vortex can form. There is a reduction in flow velocity. Since there is a sufficiently large volume available, contaminating particles in the inflowing gas can collect in the region of the bottom of the housing part 3. In other words, they are deposited there. This deposition effect results from the rotation of the gas around the tube 15, which is forcibly produced here, or the defined swirling and the differences in velocity resulting therefrom.

As has been described, the opening or end 17 of the tube 15 is vertical with respect to the longitudinal axis of the tube and is therefore virtually parallel to the inflow direction of the gas. This means that there is no direct inflow of gas into the tube 15. On the contrary, the gas must necessarily flow at least once or twice around the tube and consequently swirl until it can enter the tube 15 at the end.

Owing to the deposition of the dirt particles resulting from this rotation or swirling upstream of the inlet—and there is the additional fact that, owing to the swirling in the pre-chamber 12, a certain particle fraction has already been deposited there too—a virtually particle-free gas flow enters the tube 15.

There, the gas reaches the straightener 18, by means of which the inhomogeneous flow is straightened by being divided into a large number of individual partial flows. These partial flows are recombined after flowing through the straightener 18, but there is no further mixing owing to the straightening. It can be ensured by means of a favourable ratio between the grille spacing and the web length of the individual grilles forming the straightener.

The straightened gas flow then reaches the measuring device 20, where a certain partial flow is taken as a basis for measurement, i.e. is routed via the sensor. Since the inflowing gas is almost completely free of particles, there is consequently no clogging of the sensor and hence no disadvantageous impairment of the measuring effect. After passing through the measuring device 20 the gas passes via section 22 into the region of the gas outlet 6, where it is drawn off.

The gas meter according to the invention allows a reduction in the dirt content of the gas fed to the measuring device 20 by up to 99%, i.e. virtually all the dirt particles can be filtered out, this being achieved especially by virtue of the design-induced forced rotation of the gas around the tube 15, which is cantilevered in the region of the inlet opening 14. This is accomplished without the use of any additional filters, which are used in the prior art to filter out precisely this considerable dirt fraction and which, as a result, can become clogged. On the contrary, in the gas meter according to the invention removal of particles is accomplished purely by means of flow engineering inasmuch as, on the one hand, removal takes place already in the pre-chamber by virtue of the swirling that occurs there and the differences in velocity which arise, and especially in the region of the inflow chamber 16 and the region of the forced rotation.

The gas meter shown in FIG. 1 uses the lower housing part 3 to form the inflow chamber, i.e. the inflow chamber—which can ultimately also be referred to as a collecting chamber—is directly integrated into the housing 2.

Figure 2:
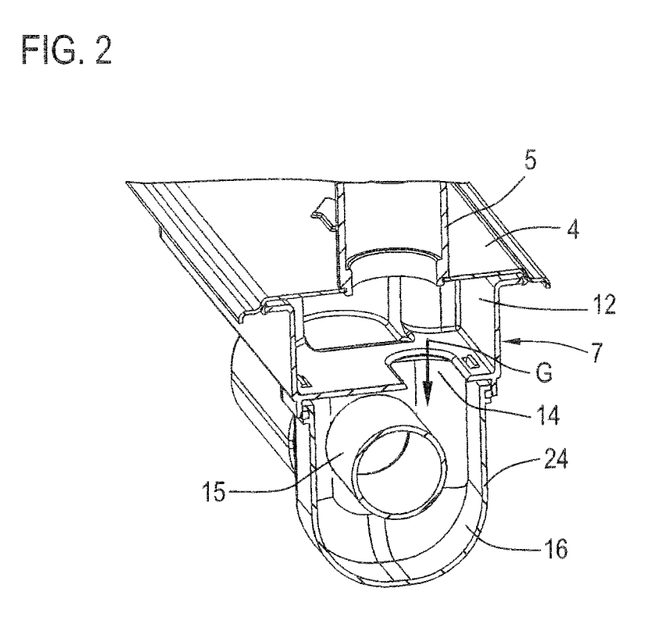
FIG. 2 shows a perspective view of another insert for a gas meter in section.
Figure 3:
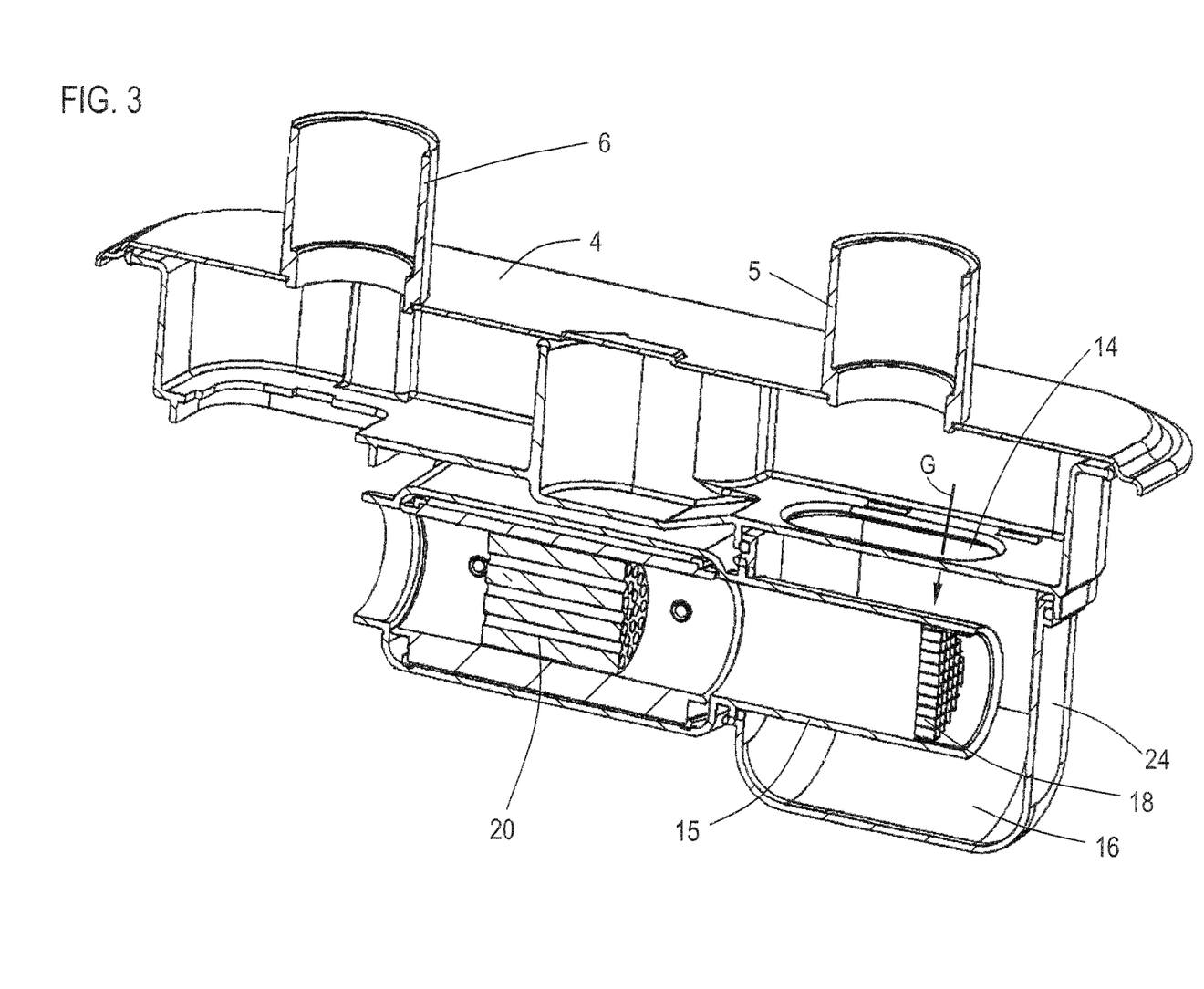
FIG. 3 shows another sectional view of the insert from FIG. 2.

As an alternative, it is also conceivable, as illustrated in FIGS. 2 and 3, to fit an additional insert component 24, which forms the closed measuring chamber 16, on the insert 7, which is here shown together with the cover 4, which is shown in section. In other words, the measuring chamber 16 here is not formed by the lower housing part 3, consequently extending over the entire length of the meter housing, but that the inflow chamber 16 is defined as a chamber with defined boundaries by means of the insert component 24. As FIG. 2 shows, the insert component 24 is made rounded in the bottom region, and, in conjunction with the laterally offset arrangement of the inflow opening 14 relative to the longitudinal axis of the tube 15, this has the result that an angular momentum is automatically imparted to the gas and there is therefore the rotation described around the tube 15 before the gas enters the tube 15 and from there passes via the straightener 18 to the measuring device 20.

As a departure from the illustration in FIG. 1, there is no need in the case of the insert shown in FIGS. 2 and 3 to couple the free rear end of the measuring section 19 to the gas outlet connection 6 by means of an insert. On the contrary, in this case the gas can flow into the free housing volume and reach the gas outlet 6 from there. This is because the separation of the gas inlet region from the gas outlet region is in this case ultimately achieved by means of the insert component 24.

Figure 4:
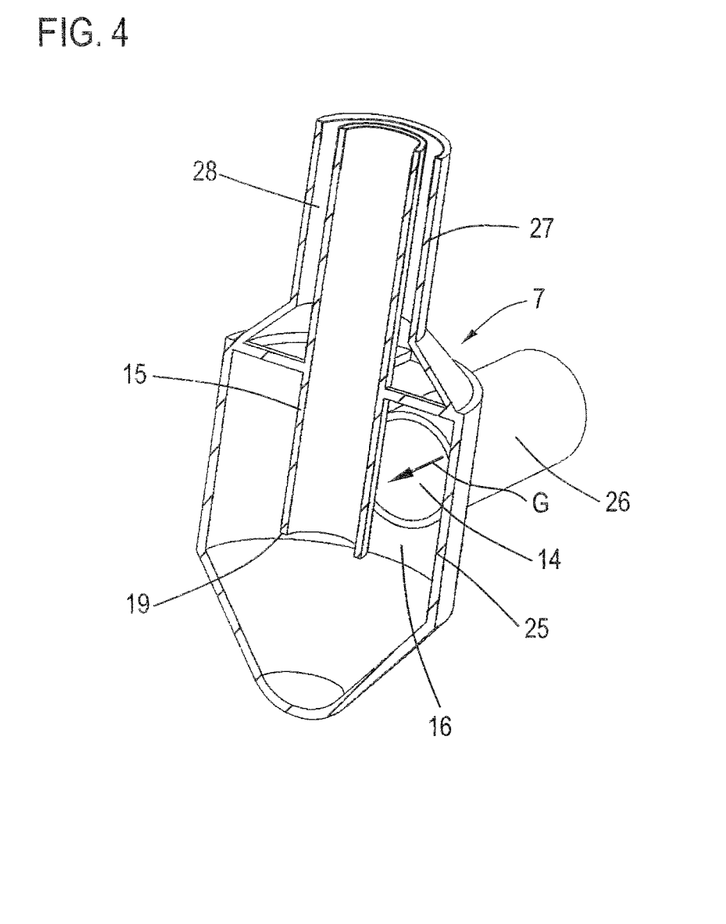
FIG. 4 shows a schematic representation, in section, of another insert that can be used.

Finally, FIG. 4 shows another embodiment of an insert 7 which can be used. Here, this insert is embodied as a hollow body which is cylindrical in a certain section, having a cylindrical section 25 that is closed by a conical shape at the bottom. This region forms the inflow chamber 16. In the example shown, a tube 26 opens into this region with its tube opening, which forms the inflow opening 14. The tube 26 is either connected directly in a suitable way to the gas inlet connection 5 or communicates in some way with the pre-chamber described or the like. It is also not absolutely necessary to provide such a tube 26; on the contrary it would also be possible to provide just a corresponding inflow opening 14 in implementing a pre-chamber and the like.

Here too, a tube 15 once again opens into the inflow chamber 16 and extends over the length of the inflow opening 14, while the lower tube end 17 is once again perpendicular to the longitudinal axis of the tube and hence parallel to the inflow direction of the gas, with the result that there is no direct entry of gas into the tube 15 in this case either. Although not shown specifically, the measuring device 20 and, if appropriate, also a straightener 18 are situated downstream in the tube 15.

The insert 7 furthermore comprises a second tube 27, or such a second tube 27 is formed thereon, surrounding the first tube 15 with a clearance. By this means, a bypass channel 28 is formed since the inflow opening 16 is open towards this bypass channel 28.

If gas then flows into the hollow chamber 16, the forced rotation occurs in this case also owing to the arrangement of the tube 15 relative to the inflow opening 14, it being possible, of course, for the inflow opening 14 to be arranged offset with respect to the longitudinal axis of the tube in this case too. If the arrangement is installed in the vertical system shown in FIG. 4, any dirt necessarily collects in the region of the lower, conical deposition region. Only after rotation can the gas enter the tube 15, where it is carried to the measuring section. A certain proportion of gas furthermore flows out of the inflow chamber 16 via the bypass channel 28 and can either be guided past the measuring device if the latter is supplied only with the gas carried in the tube 15.

Figure 5:
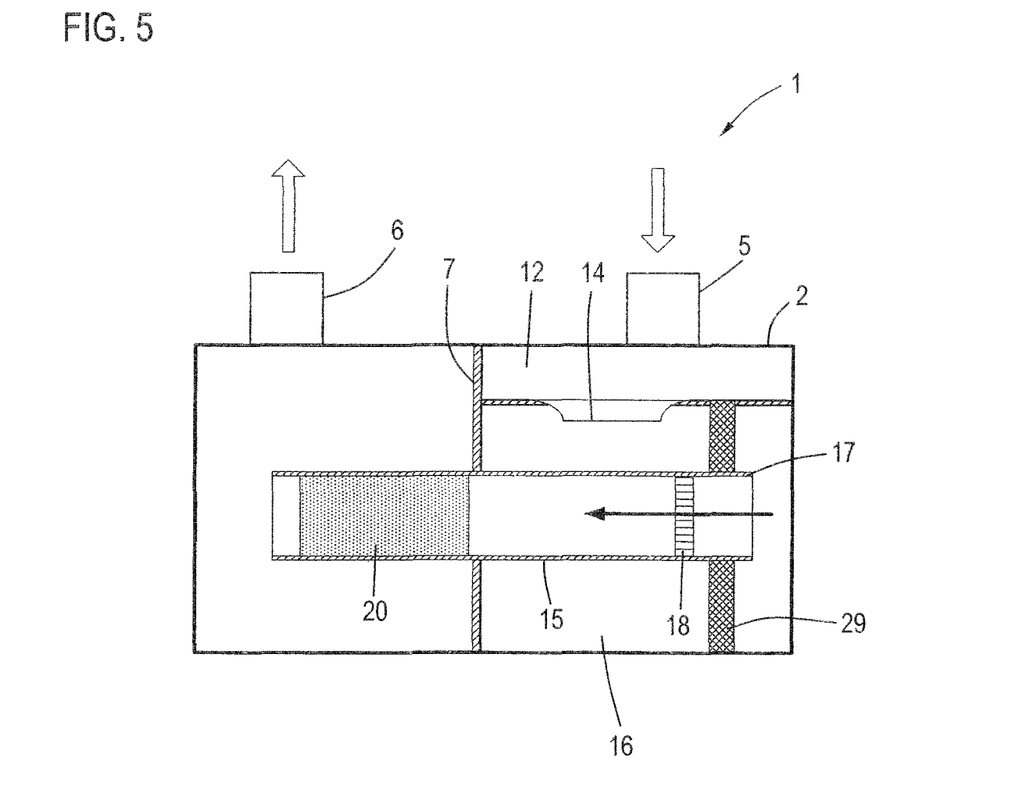
FIG. 5 shows a schematic representation of a gas meter according to the invention in another embodiment and in section.

Finally, FIG. 5 shows another embodiment of a gas meter 1 according to the invention in the form of a purely schematic representation. In the housing 2, which is once again divided by means of an insert 7 into a gas inlet region and a gas outlet region, there is once again a tube 15 with an integrated flow straightener 18 and a measuring device 20. Via the gas inlet 5, the gas flows into a pre-chamber 12, where swirling and an initial deposition of any dirt particles already occurs. Via an inflow opening 14, the gas then passes into the inflow chamber 16. Once again here, the arrangement of the tube 15 perpendicularly to the inflow direction leads to a forced rotation around the tube 15 and hence to deposition of any dirt particles on the bottom of the housing.

Here, a filter element 29 is additionally provided, said filter element surrounding the tube 15 in the region of the gas inlet end 19 and being sealed off in the housing 2 and with respect to the insert 7. This means that, after being swirled and flowing around the tube 15, the inflowing gas must necessarily pass through the filter element 29, e.g. a coarse-mesh grille or network. By this means, a residual particle fraction that may still remain, despite the cyclone-type removal process, is removed in the filter element 29. The gas then passes back into the tube 15, as shown by the arrow, is straightened and passes to the measuring device 20, from where it passes into the gas outlet region and from there to the gas outlet connection 6.

What is claimed is:

1. A gas meter comprising a housing with a gas inlet connection and an inflow chamber which is arranged downstream of the latter and into which gas flows via an inflow opening, arranged downstream of which inflow chamber is a measuring section arranged upstream of a gas outlet connection and having a measuring device, in which the gas flow is measured, wherein projecting into the inflow chamber there is a tube which merges into the measuring section or forms the latter and runs substantially perpendicularly to the gas flow direction through the inflow opening and overlaps the inflow opening, at least in a certain section.

2. The gas meter according to claim 1, wherein the inflow opening is arranged laterally offset relative to the longitudinal axis of the tube.

3. The gas meter according to claim 1, wherein the tube overlaps the inflow opening by at least half of the length of the opening, as seen in the longitudinal direction of the tube.

4. The gas meter according to claim 3, wherein the tube overlaps the inflow opening by at least ⅔ of the length of the opening.

5. The gas meter according to claim 1, wherein the tube is cantilevered, at least in the region in which it overlaps the inflow opening.

6. The gas meter according to claim 1, wherein a filter element, which surrounds the tube, preferably in the region of the gas inlet opening of the latter, said tube extending beyond the inflow opening, and extends to the wall of the inflow chamber, is provided.

7. The gas meter according to claim 1, wherein a flow straightener arranged upstream of the measuring device is arranged in the interior of the tube.

8. The gas meter according to claim 1, wherein the tube is embodied as a twin tube with an inner and an outer tube, or in that the tube is accommodated in a second tube, at least in a certain section, with the volume between the inner and the outer tube or between the first and the second tube forming a bypass channel.

9. The gas meter according to claim 1, wherein a pre-chamber arranged downstream of the gas inlet and upstream of the inflow chamber is provided, communicating with the inflow chamber via the inflow opening.

10. The gas meter according to claim 1, wherein an insert, on which the tube is arranged and by means of which the region of the gas inlet is separated from the region of the gas outlet, is arranged in the housing.

11. The gas meter according to claim 10, wherein the insert divides the housing into an upper and a lower section and simultaneously forms the pre-chamber, the tube being accommodated in the lower housing section.

12. The gas meter according to claim 10, wherein the measuring section opens directly into a gas outlet region, which is connected directly to the gas outlet connection.

13. The gas meter according to claim 10, wherein the insert is a hollow body which is cylindrical in cross section, at least in a certain section, into which preferably a gas feed tube having the inflow opening opens and from which the tube extends.

14. The gas meter according to claim 13, the insert has a section which forms a second tube, in which the first tube is arranged.

* * * * *